Figure 1:
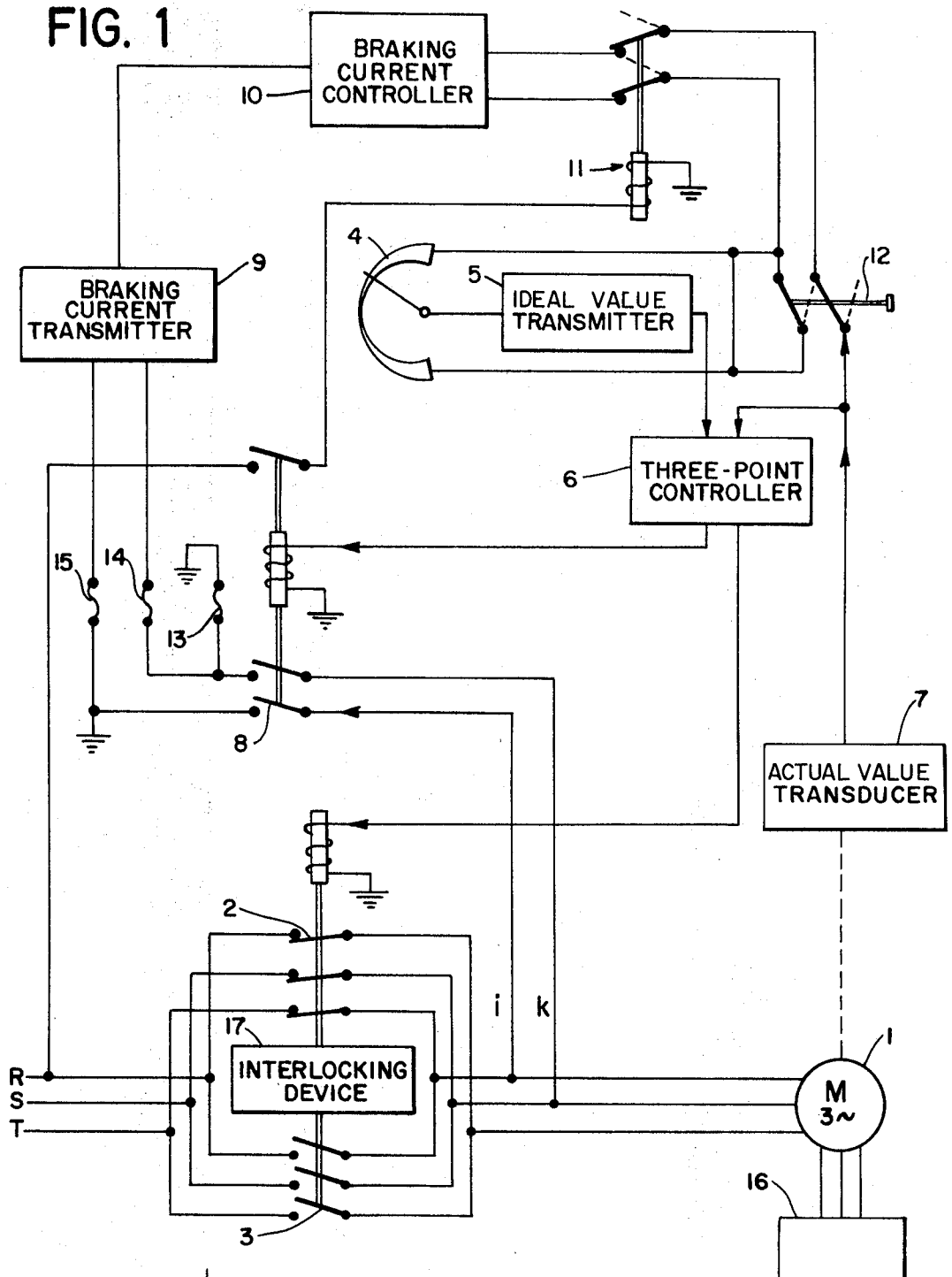

United States Patent

[11] 3,604,993

[72] Inventors: Erich Volkert;
Klaus Gunther; Gunter Willkommem, all of Erfurt, Germany
[21] Appl. No. 766,722
[22] Filed Oct. 11, 1968
[45] Patented Sept. 14, 1971
[73] Assignee Veb Starkstrom-Anlagenbau Erfurt, Germany

[54] SPEED CONTROL SYSTEM FOR CONVEYING MACHINE ENERGIZED BY THREE-PHASE CURRENT
5 Claims, 2 Drawing Figs.

[52] U.S. Cl. .................................................. 318/212, 318/227, 318/302
[51] Int. Cl. .................................................. H02p 3/24
[50] Field of Search .......................................... 318/227, 302, 211, 212

[56] References Cited
UNITED STATES PATENTS
3,514,682  5/1970  Corey ........................... 318/212
3,384,804  5/1968  Salihi ........................... 318/227
3,394,297  7/1968  Risberl ........................... 318/227

Primary Examiner—Oris L. Rader
Assistant Examiner—K. L. Crosson
Attorney—Nolte and Nolte ABSTRACT: An ideal value transmitter provides an ideal value voltage corresponding in magnitude to a desired speed of a conveying machine. An actual value transducer coupled to the rotor of the conveying machine provides an actual value voltage corresponding in magnitude to the actual speed of the machine. A three point controller connected to the transmitter and transducer provides a control signal equal to the difference in magnitude between the ideal and actual value voltages. Two reversing contactors coupled to the controller and connected to the stator of the machine supplies three-phase current to the machine under the control of the control signal provided by the controller. A direct current contactor coupled to the controller and connected to the stator of the machine supplies direct current to the machine under the control of the control signal.

PATENTED SEP 14 1971

3,604,993

INVENTORS
ERICH VOLKERT
KLAUS GÜNTHER
GÜNTER WILLKOMMEN

BY Nolte & Nolte

ATTORNEYS

3,604,993

SPEED CONTROL SYSTEM FOR CONVEYING MACHINE ENERGIZED BY THREE-PHASE CURRENT

DESCRIPTION OF THE INVENTION

The present invention relates to speed control system for a conveying machine energized by three-phase current. More particularly, the invention relates to speed control system for a conveying machine energized by three-phase current when the load is wound up and suspended.

Conveying machines with speed control energized by three-phase current are known. Such machines regulate the speed by means of two-step action controllers in accordance with the information of the speed value provided by the speed setting means. The two-step action controller controls the driving and braking of the conveying machine. The conveying machine is connected to a three-phase supply network through the armature resistances when being operated, and to an electric or mechanical brake or known brake mechanisms when being braked. The three-phase current machine, which in this case is analogous to a DC machine of a specific speed, since both may thus be braked to zero when the control lever is moved back, even with a load suspended. If a highly compounded DC machine is to be simulated, driving has to be effected in a controlled manner, in which case the position of the control lever represents the set point and the load effect is eliminated. The brake system also is advantageously an automatic control system, and when applying the dynamic braking either the armature resistance or the braking current itself is varied by the controller.

The aforedescribed conveying machines with speed control energized by three-phase current have disadvantages and drawbacks. With the suspended load at a specific speed, the setting point can be selected accordingly, and the machine may be accelerated to the desired speed. If the actual speed or voltage value or the like has reached the ideal speed or voltage value or the like, the two-step action controller switches over to the braking controller circuit. At this instance, the braking effect is initiated in accordance with the difference between the actual and ideal voltage values. Since, however, a finite time has to elapse when switching over from driving to braking, and the masses accelerate continuously, braking is deteriorated considerably. This is due to the fact that two-step action controlling is a permanent comparison of two conditions resulting in a continuous switching between the driving and braking conditions of a conveying machine.

Even if it were possible to reduce the operations per hour, due to a suitable increase in the difference of the actual and ideal voltage values, it is practicable to switch from driving to braking when there is a sudden reduction in the actual speed or voltage value, for example, when the load is wound up. This results in an impact to the rotating system, so that the mechanical parts of the installation may be damaged. Simple retardation would fail, since if there is a switchover with the load suspended, braking has to be instantaneous. Since DC braking is effected in a controlled manner, the braking moment always depends upon the difference between the ideal and actual speed or voltage values, and braking with a maximum braking moment in an emergency is practicable only mechanically.

When the switchover from braking to driving is too abrupt, there may be overlapping. To avoid overlapping, the individual switchgears must be interlocked. Interlocking is effected in most cases electrically via auxiliary contacts of contactors and relays. If the interlocking fails, the system and the operators are exposed to danger. If in high voltage machines, for example, switching from braking to driving, or vice versa, is effected without opening the brake contactor or the reversing contactor, a higher alternating voltage may be applied to the direct current power line. This will damage the power line, since it is insulated only for considerably lower voltages.

The foregoing condition is also possible when there is a breakdown arc. If there is a driving or braking switching action it may, however, be accomplished in the aforedescribed circumstances by a zero-current control at the three-phase side. Switchover is only effected when a clear signal is provided by the zero-current relay. In practice, however, this does not always ensure safe protection since when the three-phase current power line is disconnected, current oscillations may occur and trip the zero-current relay. Furthermore, the current, on which an AC component is superimposed, decreases to zero. The arrangement does not prevent damage when there is a switchover from braking to driving.

The principal object of the present invention is to provide a new and improved conveying machine with speed control.

An object of the invention is to provide a conveying machine with speed control energized by three-phase current in which the maximum braking current is supplied to the driving motor when the braking command is provided after a switchover from driving to braking, irrespective of the speed.

An object of the invention is to provide a conveying machine which may be braked with rapidity and facility.

An object of the invention is to provide a conveying machine which is controlled in speed with efficiency, effectiveness and reliability.

In accordance with the present invention a three-point controller is utilized instead of two-point controller. In accordance with the difference in the ideal and actual speed or voltage value the three-point controller operates in the following manner:

If the difference value becomes positive, the switching command for driving is provided. Only when the value is decreased due to the difference value reaching a negative limit, is there a switchover to braking. The negative limit of the controller is adjustable. If the difference between the actual and ideal value drops within the negative range below the negative limit, i.e. the actual value becomes more positive, the braking operation is maintained until said difference reaches a lower negative limit, closer to the switching point of driving.

Rapidity and facility of braking is facilitated by bridging the braking current through an emergency switch and supplying the maximum braking current. The emergency switch is required for operation by hand or foot. The invention provides effective protection for both the system and the operating personnel when the interlocking connections for the avoidance of accidental series connections from direct current to alternating current and vice verse fail. This is achieved, in accordance with the present invention, by supplying to a three-point controller input signals from an ideal value transmitter and from an actual value transducer connected to the rotor of the conveying machine. The output signals of the three-point controller are are supplied to the stator of the conveying machine through a reversing or direct current contactor, respectively, connected to a braking current controller via a braking current transmitter. For the control of a momentary supply of the maximum braking current to the conveying machine, the braking current transmitter is connected to a relay and to an emergency switch for initiating emergency braking. For protecting the interlocking switch system of the reversing contactors, a voltage and a short circuit protective device are connected in series with the braking current transmitter. For protection against ground fault at the casing, a low voltage protective device is provided.

In accordance with the present invention, a speed control system for a conveying machine energized by three-phase current comprises an ideal value transmitter for providing an ideal value voltage corresponding in magnitude to a desired speed of the conveying machine. An actual value transducer coupled to the rotor of the conveying machine provides an actual value voltage corresponding in magnitude to the actual speed of the conveying machine. A three-point controller connected to the ideal value transmitter and to the actual value transducer provides a control signal equal to the different in magnitude between the ideal and actual value voltages. A reversing contactor controlled by the three-point controller (insertion) and connected to the stator of the conveying machine supplies three-phase current to the stator of the conveying machine under the control of the control signal provided by the three-point controller. A direct current contactor controlled by the three-point controller and connected to the stator of the conveying machine supplies direct current to the stator of the conveying machine under the control of the control signal provided by the three-point controller.

A braking current controller provides a maximum braking current for the conveying machine. An input connecting circuit selectively applies the ideal value voltage to actuate the braking current controller. An output connecting circuit supplies the maximum braking current to the conveying machine via the direct current contactor. The input connecting circuit comprises a time relay for limiting the actuation of the braking current controller to a predetermined period of time. An emergency switch is connected between the ideal value transmitter and the time relay for initiating emergency braking. Operation of the emergency switch connects the ideal value transmitter to the braking current controller and disconnects the actual value transducer from the braking current controller.

The output connecting circuit of the braking current controller comprises a braking current transmitter connected to the braking current controller and a low voltage protective device connected in series with the braking current transmitter to the direct current contactor for protecting against ground fault.

A short circuit protective device is connected in series with the braking current transmitter to the direct current contactor for protecting against failure of the interlocker coupled to the reversing contactor.

Figure 2:
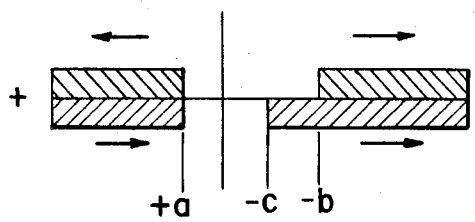

In order that the present invention may be readily carried into effect, it will now be described with reference to the accompanying drawing, wherein:

FIG. 1 is a schematic block diagram of an embodiment of the speed control system of the present invention for a conveying machine energized by three-phase current; and FIG. 2 is graphical illustration for explaining the operation of the system of FIG. 1.

In FIG. 1, when a conveying machine 1 is started and lifts or suspends the load, a reversing contactor 2 is closed. A defined direction of travel is thereby provided.

A control lever 4 is positioned by an operator in accordance with the desired speed. A suitable voltage is supplied to a three-point controller 6 via an ideal value transmitter 5. An actual value transmitter or transducer 7 produces a voltage which varies proportionally with the speed of the conveying machine 1. The three-point controller 6 compares the actual value voltage provided by the actual value transmitter 7 with the ideal value voltage provided by the ideal value transmitter 5.

If the ideal speed or voltage value is greater than the actual or voltage value, the conveying machine 1 remains connected to the three-phase power line, R, S, T since the difference between the ideal and actual values is then greater than the value $+a$ (FIG. 2) in the three-point controller 6. The reversing contactor 2 thus rests in its position shown in FIG. 1. If the speed of the conveying machine 1 increases thereby increasing the actual value, or if the ideal speed or voltage value provided by the ideal value transmitter 5 decreases by manual positioning of the control lever 4 back toward zero, the difference between ideal and actual values, as indicated by the three-point controller 6, decreases below the value $+a$ of FIG. 2 and causes the reversing contactor 2 to open until the speed of the conveying machine 1 is automatically decreased. If the difference between the ideal and actual values changes from positive to negative due to a sudden further positioning of the control lever 4 toward zero, so that $-b$ (FIG. 2) is bypassed in a negative direction, the three-point controller 6 provides the signal for switching to braking.

When the braking signal is provided, the reversing contactor 2 is opened and a DC contactor 8 closed. The amount of the braking current depends upon the excitation of a braking current transmitter 9. This depends upon the difference between the ideal and actual speed or voltage values which excites a braking current controller 10. The application of the brake is generally effective only with the load suspended, and applies the maximum braking moment upon a short-time, full excitation of the braking current transmitter 9, irrespective of the speed, following which the braking depends upon the difference between the ideal and actual voltage values. The delay time is effected by a time relay 11 which disconnects the ideal voltage value and connects the actual voltage value to the braking current controller 10 to its greatest extent during the maximum braking period.

The three-point controller 6 disconnects the conveying machine 1 from the DC voltage source (not shown) and connects said machine to the three-phase power line, only when the difference between the ideal and actual values bypasses the value $-c$ (FIG. 2) in a positive direction. This prevents the machine from being brought to a complete standstill. Some delay of the switching action, however, is necessary to prevent the conveying machine 1 with its suspended load from being uncontrolled for a longer period. Switching from braking to driving is without delay, and is within the shortest time possible.

If emergency braking is initiated by the manual positioning of the control lever 4 back to zero, the braking moment absolutely depends upon the speed controlled at that time. When the operator actuates the emergency switch 12, the complete actual voltage value is supplied as the ideal value to the braking current controller 10 for its comparison with an actual value of zero. The maximum excitation, and thus the maximum braking moment, is thus applied via the braking current transmitter 9.

If a mutual interlocking device 17 of the reversing contactors 2 and 3 fails and causes the DC power line to be connected to the three-phase power line, high alternating voltage in a phase $i$ may be conducted directly to ground. A voltage protective device 13 is actuated via a phase $k$, thereby initiating a two-pole ground fault when a predetermined voltage limit is exceeded. There is then a short circuit rapid release at the three-phase current end and the system is disconnected. At the direct current end, the braking current transmitter 9 is switched out of circuit in response to the operation of a short circuit protective device 14.

If the alternating voltage at the direct voltage end is insufficient in magnitude, to cause the voltage protective device 13 to respond, the short circuit protective device 14 is opened due to the high current, which current is dependent upon relatively low internal resistance of the braking current transformer 9. If there is a ground fault at the casing, the low voltage protective device 15 protects the braking current transmitter 9 from damage.

Each of the components 1 to 17 of FIG. 1 is a known component which functions in the manner indicated.

Finally we would like to explain in more detail the individual block symbols.

The ideal value transducer 5 consists of a self-sychronizing transmitter or an adjustable transformer or a potentiometer and transforms the value predetermined by the control lever to an electric quantity (e.g. voltage). (Reference: "Drehmelder" VEB Funkwerk Berlin-Koepenick, Wendenschlobstrasse 154–158.

The three-pint controller is a transistorized device. It decides discontinuously between 3 switch positions "+," "0," "−," according to quantity and polarity of the input quantity.

The controller operates according to the following principle:

The actual value and ideal value voltage is applied to an ohmic resistance. Dependent on the preponderance of the actual or ideal value either positive or negative voltage can be taken off from the resistance. Two bistable multivibrators take care that 2 relais are being connected through electronic amplifiers in the case of voltage increasing values which can be varied at will and in advance. The multivibrators operate in the opposite sense, i.e. one multivibrator operates within the positive and the other within the negative range of voltage so that the two relais can never be connected at the same time. As to the voltages about "0" a specific range can also be adjusted within which none of the two relais can be connected. According to the quantity and polarity of the input voltage the following switch positions are practicable:

$$S_1 \rightarrow u \geq u_1$$
$$S_2 \rightarrow u = 0$$
$$S_3 \rightarrow u \leq u_2$$

The actual value transducer indicates an electric quantity (voltage) proportional to the speed and is, in most cases, designed as a tachogenerator.

The braking current transmitter makes the required braking current available. For this purpose mostly machine generators or rectifier batteries are applied.

The braking current controller can be designed as transducer or as semiconductor controller. It controls the braking current for obtaining a desired quantity by varying the braking current transformer, e.g. field control with a generator or pulse control in the case of a controllable rectifier. The controller operates according to the following principle:

No higher demands are made on this controller dynamically. Until the braking current of a generator is available a transducer is applied for the control of the braking current; the transducer is modulated through the actual value voltage (speed) on one hand, and through the ideal value (control lever positioning) on the other hand. The braking current is fed back through a third control winding. This function can be accomplished by an electronic amplifier in the same manner. If rectifiers are being used for the generation of the braking current, then a three-phase transformer or a servomotor is energized which vary the alternating voltage and/or the three-phase voltage directly or through a variable ratio transformer.

In the the case that the rectifiers are controllable an electronic controller will supply a pulse generator varying again about the thyristors.

The starter is variable resistor whose amount of resistance can be adjusted continuously by dipping the electrodes into a liquid (electrolyte) or by varying the level of the liquid.

In the interlocking device 17 the reversing contactors and the direct current contactors are interlocked across the auxiliary contacts attached to the contactors in such a manner that either a reversing contactor or the direct current contactor can be connected thereto.

What we claim is:

1. A speed control system for a conveying machine energized by three-phase current, said conveying machine having a rotor and a stator, said speed control system comprising an ideal value transmitter for providing an ideal value voltage corresponding to a desired speed of said conveying machine, an actual value transducer coupled to the rotor of said conveying machine for providing an actual value voltage corresponding in magnitude to the actual speed of said conveying machine, three-point controller means connected to said ideal value transmitter and to said actual value transducer for providing a control signal equal to the difference in magnitude between said ideal and actual value voltages, reversing contactor means coupled to said controller means and connected to the stator of said conveying machine for supplying three-phase current to the stator of said conveying machine under the control of the control signal provided by said controller means, and direct current contactor means coupled to said controller means and connected to the stator of said conveying machine for supplying direct current to the stator of said conveying machine under the control of the control signal provided by said controller means, further comprising braking current controller means for providing maximum braking current for said conveying machine, input connecting means for selectively applying said ideal value voltage to actuate said braking current controller means, and output connecting means for supplying said maximum braking current to said conveying machine via said direct current contactor means, and wherein the input connecting means of said braking current controller means further comprises emergency switch means connected between said ideal value transformer and said time relay means for initiating emergency braking.

2. A speed control system as claimed in claim 1, wherein the output connecting means of said braking current controller means comprises braking current transformer means connected between said braking current controller means and said direct current contactor means.

3. A speed control system as claimed in claim 1, wherein operation of said emergency switch means connects said ideal value transformer to said braking current controller means and disconnects said actual value transducer from said braking current controller means.

4. A speed control system as claimed in claim 1, wherein the output connecting means of said braking current controller means comprises braking current transformer means connected to said braking current controller means and low voltage protective means connected in series with said braking current transformer means to said direct current contactor means for protecting against ground fault.

5. A speed control system as claimed in claim 1, further comprising interlocking means coupled to said reversing contactor means for interlocking said reversing contacting means and wherein the output connecting means of said braking current controller means comprises braking current transformer means connected to said braking current transformer means and short circuit protective means connected in series with said braking current transformer means to said direct current contactor means for protecting against failure of said interlocking means.